United States Patent
Donolo

(10) Patent No.: US 11,588,432 B2
(45) Date of Patent: Feb. 21, 2023

(54) MOTOR MONITORING AND PROTECTION USING RESIDUAL VOLTAGE

(71) Applicant: Schweitzer Engineering Laboratories, Inc., Pullman, WA (US)

(72) Inventor: Marcos A. Donolo, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 687 days.

(21) Appl. No.: 16/172,308

(22) Filed: Oct. 26, 2018

(65) Prior Publication Data

US 2019/0158010 A1 May 23, 2019

Related U.S. Application Data

(60) Provisional application No. 62/588,112, filed on Nov. 17, 2017.

(51) Int. Cl.
- *H02P 21/00* (2016.01)
- *H02P 29/64* (2016.01)
- *H02P 6/182* (2016.01)

(52) U.S. Cl.
CPC .............. *H02P 29/64* (2016.02); *H02P 6/182* (2013.01)

(58) Field of Classification Search
CPC ................................ H02P 29/64; H02P 6/182
USPC ........................................................ 318/806
See application file for complete search history.

(56) References Cited

U.S. PATENT DOCUMENTS

| | | | |
|---|---|---|---|
| 2,205,253 A | 6/1940 | Gulliksen | |
| 3,408,547 A | 10/1968 | Saeger | |
| 3,818,294 A | 6/1974 | Glukhov | |
| 4,218,718 A | 8/1980 | Sun | |
| 4,547,826 A | 10/1985 | Premerlani | |
| 4,659,973 A | 4/1987 | Stich | |
| 4,743,818 A | 5/1988 | Quayle | |
| 4,761,703 A | 8/1988 | Kliman | |
| 4,839,589 A | 6/1989 | Heinle | |
| 4,914,386 A | 4/1990 | Zocholl | |

(Continued)

FOREIGN PATENT DOCUMENTS

| | | |
|---|---|---|
| CH | 261489 | 5/1949 |
| WO | 2008116966 | 10/2008 |

(Continued)

OTHER PUBLICATIONS

Stanley E. Zocholl, Schweitzer Engineering Laboratories, Inc.—Tutorial: From Steinmetz Model to the Protection of High Inertia Drives, Oct. 2006.

(Continued)

*Primary Examiner* — Kawing Chan
*Assistant Examiner* — Gabriel Agared
(74) *Attorney, Agent, or Firm* — Bradley W. Schleid; Richard M. Edge

(57) ABSTRACT

Residual voltage measurements taken after removal of electric power to an electric motor are used to improve the functioning of an electric motor monitoring system. For example, an intelligent electronic device (IED) may acquire residual voltage measurements of a motor after disconnected electric power to the motor. The IED may determine a thermal condition of the motor based at least in part on the residual voltage measurement. The IED may prevent starting of the motor based at least in part on the thermal condition.

17 Claims, 11 Drawing Sheets

(56) References Cited

U.S. PATENT DOCUMENTS

| | | | |
|---|---|---|---|
| 5,030,917 A | 7/1991 | Kliman | |
| 5,086,264 A | 2/1992 | Kelledes | |
| 5,278,485 A * | 1/1994 | Kim | H02P 21/06 |
| | | | 318/802 |
| 5,436,784 A | 7/1995 | Schweitzer | |
| 5,539,601 A | 7/1996 | Farag | |
| 5,548,197 A | 8/1996 | Unsworth | |
| 5,644,510 A | 7/1997 | Weir | |
| 5,654,620 A | 8/1997 | Langhorst | |
| 5,684,342 A | 11/1997 | Innes | |
| 5,706,153 A | 1/1998 | Innes | |
| 5,726,911 A | 3/1998 | Canada et al. | |
| 5,761,018 A | 6/1998 | Blakely | |
| 5,793,595 A | 8/1998 | Schweitzer | |
| 5,821,715 A * | 10/1998 | Plutowski | H02P 1/04 |
| | | | 318/472 |
| 5,852,351 A | 12/1998 | Canada et al. | |
| 5,856,903 A | 1/1999 | Smith | |
| 5,872,722 A | 2/1999 | Oravetz | |
| 6,042,265 A | 3/2000 | Kiliman | |
| 6,138,078 A | 10/2000 | Canada et al. | |
| 6,172,509 B1 | 1/2001 | Cash | |
| 6,297,742 B1 | 10/2001 | Canada et al. | |
| 6,308,140 B1 | 10/2001 | Dowling | |
| 6,356,421 B1 | 3/2002 | Guzman-Casillas | |
| 6,456,946 B1 | 9/2002 | O'Gorman | |
| 6,757,146 B2 | 6/2004 | Benmouyal | |
| 6,856,115 B2 | 2/2005 | Branecky | |
| 6,975,946 B2 | 12/2005 | Al-Hamrani | |
| 7,065,437 B2 | 6/2006 | Mir | |
| 7,123,457 B2 | 10/2006 | Schweitzer | |
| 7,161,778 B2 | 1/2007 | Zocholl | |
| 7,336,455 B2 | 2/2008 | Dimino | |
| 7,675,720 B1 | 3/2010 | Zocholl | |
| 8,080,964 B2 | 12/2011 | Hudson | |
| 8,106,621 B2 | 1/2012 | Sato | |
| 8,140,291 B2 * | 3/2012 | Kasztenny | G01R 31/34 |
| | | | 702/115 |
| 8,232,760 B2 | 7/2012 | Lu | |
| 8,356,003 B2 | 1/2013 | Chen | |
| 8,484,150 B2 | 7/2013 | Sparling | |
| 8,725,451 B2 | 5/2014 | Whitefield | |
| 9,151,802 B2 | 10/2015 | Donolo | |
| 9,176,024 B2 | 11/2015 | Jensen | |
| 10,054,641 B2 | 8/2018 | Donolo | |
| 10,298,168 B2 | 5/2019 | Donolo | |
| 2003/0076064 A1 | 4/2003 | Kleinau | |
| 2003/0076065 A1 | 4/2003 | Shafer | |
| 2003/0171895 A1 | 9/2003 | Harris | |
| 2004/0260488 A1 | 12/2004 | Al-Hamrani | |
| 2004/0264073 A1 | 12/2004 | Zocholl | |
| 2005/0043873 A1 | 2/2005 | Mir | |
| 2005/0151494 A1 | 7/2005 | Lelkes | |
| 2006/0232237 A1 | 10/2006 | Jadot | |
| 2006/0250102 A1 | 11/2006 | Payne | |
| 2006/0290316 A1 | 12/2006 | Seguchi | |
| 2007/0035398 A1 | 2/2007 | Vesel | |
| 2007/0078614 A1 | 4/2007 | Discenzo | |
| 2007/0132446 A1 | 6/2007 | Kleinau | |
| 2007/0182359 A1 | 8/2007 | Wahler | |
| 2008/0018288 A1 | 1/2008 | Malrait | |
| 2008/0258672 A1 | 10/2008 | Osman | |
| 2008/0315811 A1 | 12/2008 | Hudson | |
| 2009/0284212 A1 | 11/2009 | Turner | |
| 2009/0315329 A1 | 12/2009 | Duffey | |
| 2010/0060227 A1 | 3/2010 | Zocholl | |
| 2010/0194324 A1 * | 8/2010 | Kasztenny | G01R 31/34 |
| | | | 318/490 |
| 2010/0194329 A1 | 8/2010 | Lu | |
| 2010/0214709 A1 | 8/2010 | Hall | |
| 2010/0301792 A1 | 12/2010 | Tiwari | |
| 2010/0315033 A1 | 12/2010 | Lu | |
| 2011/0194318 A1 | 8/2011 | Kono | |
| 2011/0213744 A1 | 9/2011 | Sparling | |
| 2011/0279076 A1 | 11/2011 | Hirt | |
| 2011/0313717 A1 | 12/2011 | Lu | |
| 2012/0001580 A1 | 1/2012 | Zhang | |
| 2012/0010831 A1 * | 1/2012 | Kagan | G01D 4/004 |
| | | | 702/60 |
| 2012/0056570 A1 | 3/2012 | Hudson | |
| 2012/0091936 A1 * | 4/2012 | Hsu | H02K 29/08 |
| | | | 318/400.38 |
| 2012/0217908 A1 | 8/2012 | Wu | |
| 2012/0265457 A1 | 10/2012 | Donolo | |
| 2012/0280645 A1 | 11/2012 | Olsson | |
| 2013/0088799 A1 | 4/2013 | Zeller | |
| 2013/0107400 A1 | 5/2013 | Meng | |
| 2013/0314822 A1 | 11/2013 | Dio | |
| 2015/0311849 A1 | 10/2015 | Zhang | |
| 2020/0067445 A1 * | 2/2020 | Chowdhury | H02H 9/00 |

FOREIGN PATENT DOCUMENTS

| | | |
|---|---|---|
| WO | 2011076263 | 6/2011 |
| WO | 2013004285 | 1/2013 |
| WO | 2016037711 | 3/2016 |

OTHER PUBLICATIONS

E.O. Schweitzer, III, S.E. Zocholl, Aspects of Overcurrent Protection for Feeders and Motors, May 1994.

Stanley E. Zocholl, Comparing Motor Thermal Models, 2003.

Patrick Whatley, Mark Lanier, Lee Underwood, Stan Zocholl, Enhanced Motor Protection with the Slip-Dependent Thermal Model: A Case Study, Sep. 12, 2007.

S.E. Zocholl, Induction Motors: Part I—Analysis, 1996.

S.E. Zocholl, Induction Motors: Part II—Protection, 1996.

Stanley E. Zocholl, Optimizing Motor Thermal Models, Apr. 24, 2006.

Stanley E. Zocholl, Armando Guzman-Casillas, Thermal Models in Power System Protection, 1999.

S.E. Zocholl, Understanding Service Factor, Thermal Models, and Overloads, Oct. 2005.

S.E. Zocholl, Gabriel Benmouyal, Using Thermal Limit Curves to Define Thermal Models of Induction Motors, Oct. 2001.

Ed Lebenhaft, Field Evaluation of Slip-Dependent Thermal Model for Motors with High-Inertia Starting, May 2007.

Ed Lebenhaft, Mark Zeller, Estimating Key Parameters for Protection of Undocumented AC Motors, Mar. 18, 2008.

Ed Lebenhaft, Mark Zeller, Advanced Thermal Motor Protection Using Digital Relays, Oct. 6, 2008.

Benouzza, N., Benyettou, A., Bendiabdellah, A., An Advanced Park's Vectors Approach for Rotor Cage Diagnosis, IEEE First International Symposium on Control, Communications and Signal Processing, Mar. 21-24, 2004.

Didier, G., Ternisien, E., Caspary, O., Razik H., Fault Detection of Broken Rotor Bars in Induction Motor using a Global Fault Index, IEEE Transactions on Industry Applications , vol. 42, Issue 1, Jan. 30, 2006.

Douglas, H., Pillay, P., Ziarani, A., Detection of Broken Rotor Bars in Induction Motors Using Wavelet Analysis, IEEE International Electric Machines and Drives Conference, Jun. 2003.

Stankovic, Dragen, et al., Enhanced Algorithm for Motor Rotor Broken Bar Detection, IEEE Industrial and Commercial Power Systems Technical Conference, May 9-13, 2010.

Kliman, G.B., et al., Noninvasive Detection of Broken Rotor Bars in Operating Induction Motors, IEEE Transactions on Energy Conversion, vol. 3, No. 4, Dec. 1988.

Shaw, Steven R.; and Leeb, Steven B.: "Identification of Induction Motor Parameters from Transient Stator Current Measurements" Feb. 1999, IEEE Transactions Industrial Electronics; vol. 46, No. 1, pp. 139-149.

Borim, Thiago Leite, et al., Benefits of Monitoring the Rotor Electrical Quantities and Transmitting by Wireless Communication, Presented at IEEE 2015 Petroleum and Chemical Industry Conference, Oct. 2015.

Arebi, Lufti, Gu, J., Ball, Andrew and Gu, Fengshou (2010) Investigation of a Rotating Shaft with a Novel Integrated Wireless

(56) References Cited

OTHER PUBLICATIONS

Accelerometer. In: The Seventh International Conference on Condition Monitoring and Machinery Failure Prevention Technologies, Jun. 22-24, 2010, Ettington Chase, Stratford-upon-Avon, England, UK.

Cardoso, A.J.M., and Saraiva E.S., Computer-Aided Detection of Airgap Eccentricity in Operating Three-Phase Induction Motors by Park's Vector Approach, IEEE Transactions on Industry Applications, vol. 29, Issue 5, Sep./Oct. 1993.

Cardoso, A.J.M., Cruz, S.M.A., Carvalho, J.F.S., Saraiva, E.S., Rotor Cage Fault Diagnosis in Three-Phase Induction Motors, by Park's Vector Approach, IEEE Industry Applications Conference, Oct. 1999.

Cruz, S.M.A., Cardoso, A.J.M., Stator Winding Fault Diagnosis in Three-Phase Synchronous and Asynchronous Motors, by the Extended Park's Vector Approach, IEEE Transactions on Industry Applications, vol. 37, No. 5, Sep./Oct. 2001.

Williamson, S., and Smith, A.C., Steady-State Analysis of 3-Phase Cage Motors with Rotor-Bar and End-Ring Faults, IEE Proc. vol. 129, Pt.B, No. 3, May 1982.

Benbouzid et al., What Stator Current Processing-Based Technique to Use for Induction Motor Rotor Faults Diagnosis?, Jun. 2003, IEEE Transactions on Energy Conversion, vol. 18, No. 2.

Benbouzid et al., A Review of Induction Motors Signature Analysis as a Medium for Faults Detection, Oct. 2000, IEEE Transactions on Industrial Electronics, vol. 47, No. 5.

Didier et al., A New Approach to Detect Broken Rotor Bars in Indcution Machines by Current Spectrum Analysis, Apr. 25, 2006, Mechanical Systems and Signal Processing 21 (2007), p. 1127-1142.

R.L. Nailen, Power Plant Electrical Reference Series, vol. 6, Motors (1987), pp. 128-131.

ABB MACHsense-R—Remote Condition Monitoring Service Installation and Comissioning Manual, 2012.

Hesler, Steve: Wireless Sensor Technology Measures Torsional Shaft Vibration in Turbine Generators, Jan. 1, 2016.

Misra, Randhir Kumar, Recent Trends in Power Plant Bus Transfer Systems & Philosophies, Rawatbhata Nuclear Power Corporation of India Ltd. Presented at 17th Annual National Power Systems Conference, Dec. 2012.

Sidhu, Tarlochan S., et al., A Modern Automatic Bus Transfer Scheme, International Journal of Control, Automation, and Systems, vol. 3, No. 2, Jun. 2005.

\* cited by examiner

MOTOR MONITORING AND PROTECTION USING RESIDUAL VOLTAGE

RELATED APPLICATION

The present application claims the benefit under 35 U.S.C. § 119(e) of U.S. Provisional Patent Application No. 62/588,112, entitled "Motor Monitoring and Protection Using Residual Voltages", filed Nov. 17, 2017, which is herein incorporated by reference in its entirety and for all purposes.

TECHNICAL FIELD

This disclosure relates to electric motors and, more particularly, to monitoring and protection of electric motors using residual voltage.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
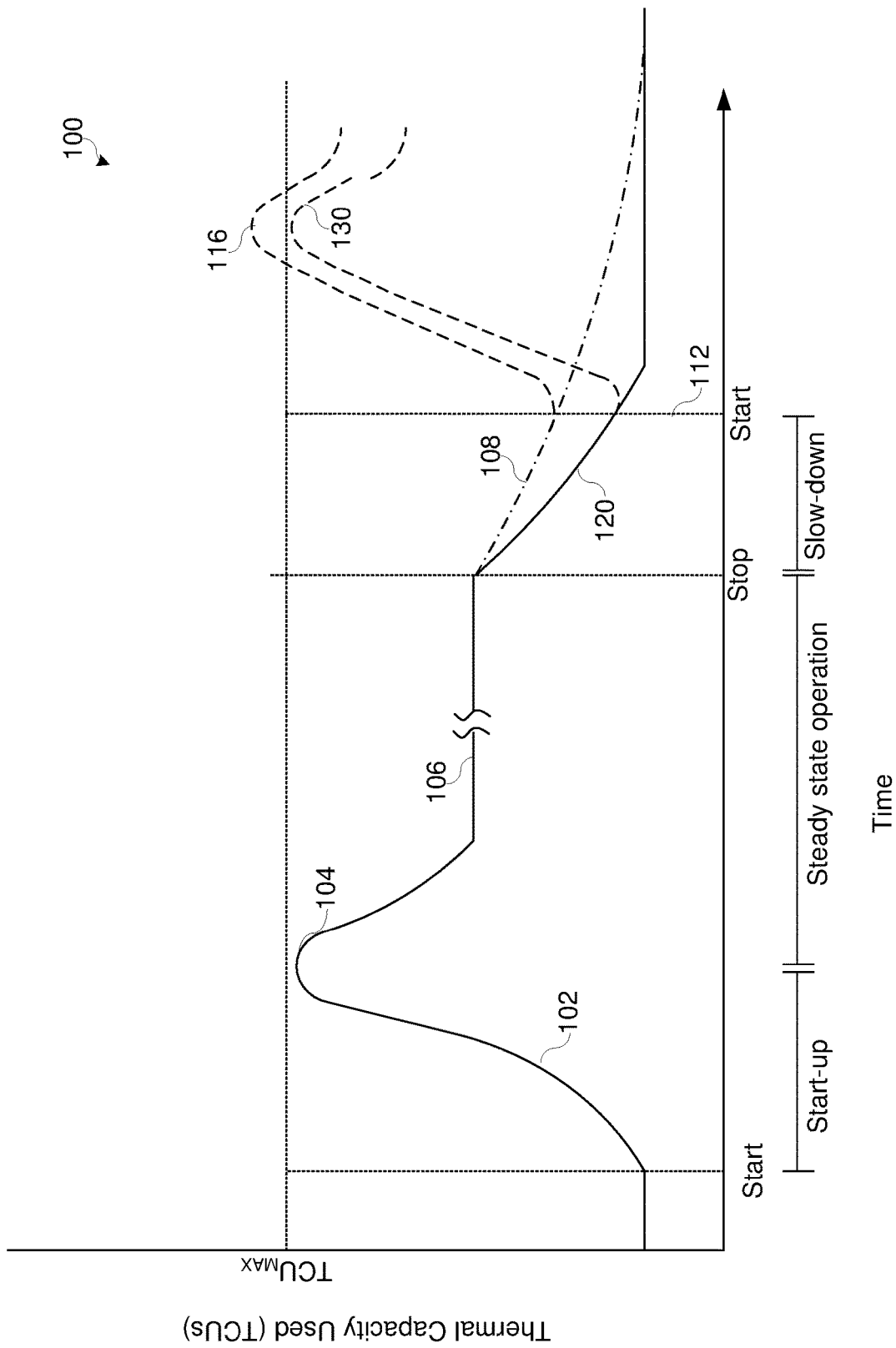
FIG. 1 illustrates a plot of thermal capacity used (TCU) with respect to time of the three-phase motor of FIG. 1, in accordance with an embodiment.

Industries use motors to transform electrical energy into mechanical energy to perform work. Efficient monitoring and protection of electric motors benefits the efficiency and longevity of this equipment. For example, an intelligent electronic device (IED) may be used to collect measurements from a motor and use the collected measurements in protection or monitoring elements to determine whether the motor is operating outside of predetermined acceptable operating conditions. If the motor is operating outside of the predetermined acceptable operating conditions, then the IED may take an action such as, for example, removing electric power to the motor by signaling a circuit breaker to open. Other protective actions may include a bus transfer operation, alarm actions, or the like.

Motors may be monitored for thermal conditions because overheating may cause mechanical stresses in a motor that may decrease the lifetime of the equipment. For example, some motors may be equipped with thermocouples to detect the thermal conditions of the motor. However, thermocouples may not be provided in the motor, or leads to the IED from the thermocouple may be inaccessible or unreliable. Further, to protect the motor from overheating, some IEDs may overestimate the amount of time for cooling the motor if the IED does not monitor the thermal conditions directly. Overestimating the amount of time for cooling the motor may result in additional downtime to restart the motor. Accordingly, there is a need in the field to monitor thermal conditions of the motor (e.g., without thermocouples).

An IED may monitor the thermal conditions of the motor based at least in part on a residual voltage of the motor. The residual voltage may refer to the voltage at the terminals of the motor that is produced due to rotation of the motor after the motor is disconnected from electrical power. In certain embodiments, the residual voltage may be used to determine a coast time of the motor. The coast time may refer to the amount of time that the rotor of the motor continues to rotate, after the motor is electrically disconnected from electrical power, due to the inertia of the rotor established while the motor is powered. For instance, the rotation of the motor may cause additional cooling due to moving air (e.g., via rotation of a fan) near the rotor. The coast time may be used in a thermal model that is used to determine thermal conditions of the motor. By accounting for additional cooling of the motor from the coast time in determining thermal conditions of the motor, the motor may be allowed to restart faster than if the thermal model used preset values (e.g., preset times) were used to prevent the motor from overheating.

Additionally and/or alternatively, the IED may determine a rotor resistance of the thermal model based on the residual voltage. The rotor resistance may be directly proportional to the slip of the motor. Further, the slip of the motor may be based on the difference between the synchronous speed and the operating speed of the motor. The residual voltage may be used to determine the operating speed of the motor by extrapolating the rotor speed when the electric power is removed based on the rate of decay of the frequency of the residual voltage. By using the residual voltage to determine the rotor resistance, the thermal conditions of the motor may be more accurately represented in the thermal model and downtime of the motor may be reduced.

In some embodiments, the IED may display, on a display of the IED, an operating characteristic of the motor based at least in part on the residual voltage. For example, the display of the IED may provide a motor stop report that includes the motor power and speed, time to stop, residual voltage magnitude, residual voltage angle, or the like. By comparing motor stop reports to historical reports, operators may detect mechanical or electrical issues in the motor or load over time.

FIG. 1 is a plot 100 of thermal capacity used (TCUs) with respect to time for a motor. TCUs may indicate heating of the motor. In the illustrated embodiment, the TCUs of the motor may initially increase, at ramp 102, to a maximum start TCU (e.g., spike 104) due to increased current and voltage in the motor. After starting up the motor, the heating of the motor may decrease to a steady state TCU operating rate 106. At some point, the motor may be electrically disconnected from power.

Upon removal of electric power from the motor, whether it is in response to an event on the electric motor, a bus transfer operation, or other loss, the electric motor may continue to rotate due to, for example, inertia of the spinning mass of the motor. As the motor slows down, the motor cools and the TCUs of the motor decrease over time. As mentioned above, an IED may monitor thermal conditions (e.g., temperature, TCU, etc.) of the motor.

Figure 2:
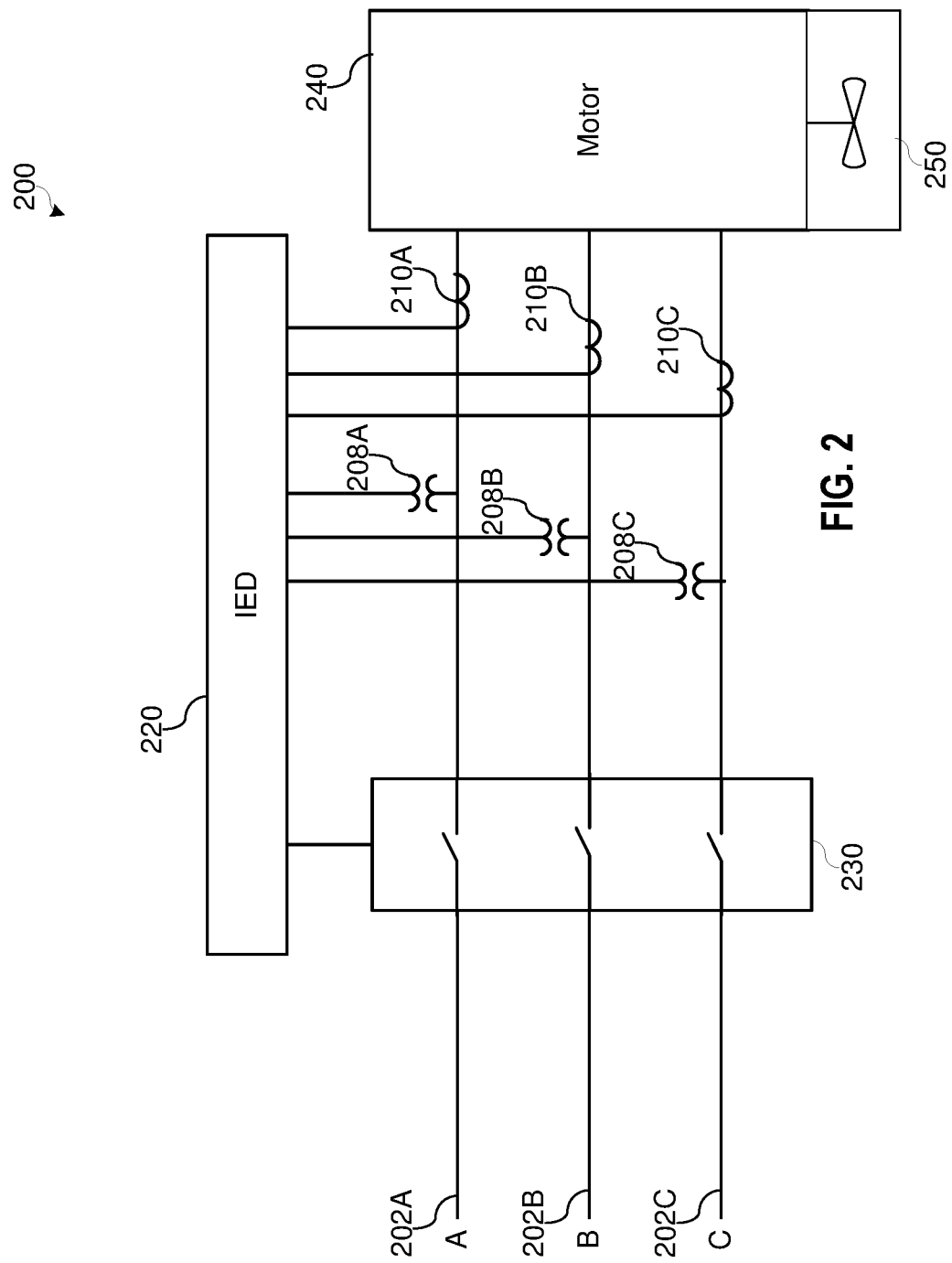
FIG. 2 illustrates a simplified block diagram of a three-phase motor and an intelligent electronic device (IED), in accordance with an embodiment.

FIG. 2 illustrates a block diagram of a system 200 including a three-phase motor 240 and an IED 220. The IED 220 selectively connects the motor 240 to a power generator that provides power via phases of electric power 202A, 2026, and 202C. The motor 240 includes inputs from each phase of electric power 202A, 202B, and 202C. The inputs each include a current transformer 210A, 2106, and 210C for providing inputs to the IED 220 representing the currents from each phase to the motor 240. The inputs each also include a potential transformer 208A, 208B, and 208C for providing inputs to the IED 220 representing the voltages of each phase to the motor 240. With the current and voltage signals from each phase, the IED 220 can monitor various conditions of the motor 240 according to several embodiments herein.

IED 220 may be configured to monitor and protect the electric motor 240 using measurements of electric power provided to the motor 240 obtained from CTs and PTs 208A-C and 210A-C. Upon detection of an event, IED 220 may be configured to remove power from the electric motor 240 by operation of switching device 230 such as a circuit breaker, contactor, or the like. That is, using the measurements from CTs and PTs 208A-C or 210A-C, the IED 220 may detect an abnormal operating condition, and signal the switching device 230 to open, disconnecting electric power from the motor. In addition to opening the switching device 230 due to an event, the IED 220 may be configured to switch the source of electric power from one bus to another bus in what may be referred to as a bus transfer operation. Additional IEDs and switching devices may be used to effect a bus transfer operation.

The windings of the stator and rotor of the motor 240 exhibit resistance to electrical current. When current passes through the windings, a portion of the electrical energy is transformed to thermal energy due to the resistance of the windings, causing the temperature in the windings to rise. The rotation of the rotor assists with the removal of a portion of the thermal energy from the windings. Further, in the illustrated embodiment, the motor 240 includes a fan 250 nonrotatably coupled to the rotor of the motor 240 such that rotation of the rotor causes the fan 250 to rotate to cool the motor 240.

Figure 3:
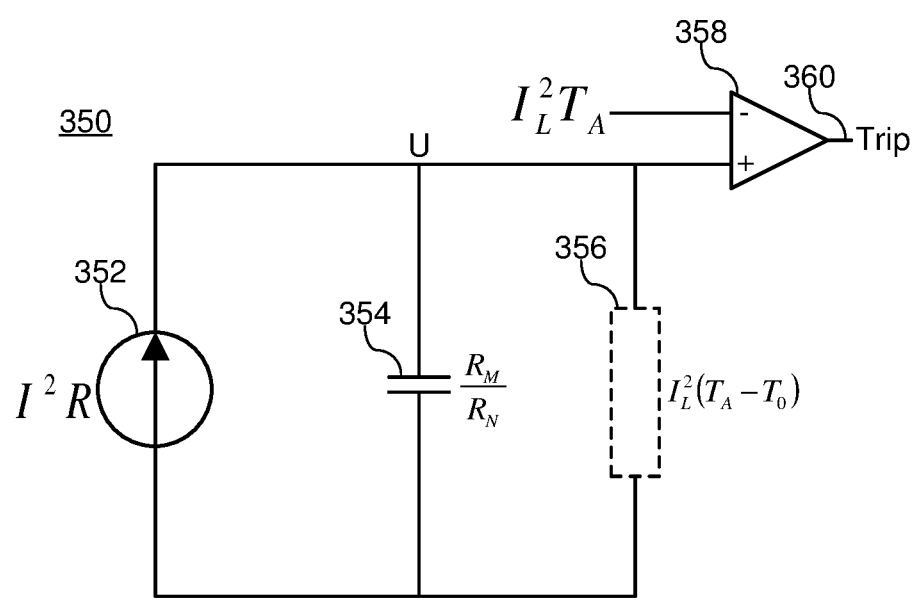
FIG. 3 illustrates a representative circuit diagram of a rotor thermal model for the electric motor of FIG. 2, in accordance with an embodiment.

FIG. 3 is a first-order thermal model 350 of the rotor temperature of the motor 240, represented by the current source 352. The model 350 illustrates the heating effect caused by the power supplied to the motor 240. In the illustrated model, the heating effect is a product of the rotor current (I) squared and the rotor resistance (R), thus:

$$I^2 R \qquad \text{Eq. 1}$$

The capacitive element 354 represents the thermal mass used to estimate thermal conditions, and in certain embodiments the equivalent effect may be calculated using a ratio of the locked rotor resistance $R_M$ to the rotor resistance at rated speed $R_N$. In certain embodiments, $R_M$ and $R_N$ may be calculated as shown in Equations 2 and 3:

$$R_M = \frac{LRQ}{I_L^2} \qquad \text{Eq. 2}$$

$$R_N = 1 - \frac{FL\omega}{Syn\omega} \qquad \text{Eq. 3}$$

Where
LRQ is the locked rotor torque in per unit of rated torque;
$I_L$ is the locked rotor current in per unit full load current;
FLω is the full load speed; and,
Synω is the synchronous speed.

The resistive element 256 represents a cooling effect present in the motor 240, which may be calculated as shown in Equation 4:

$$I_L^2(T_A - T_0) \qquad \text{Eq. 4}$$

Where:
$T_A$ is the locked rotor thermal limit time, starting with the motor 240 at ambient temperature; and,
$T_0$ is the locked rotor thermal limit time starting when the motor 240 is at a run temperature.

The rotor resistance $R_R$, represented by the resistive element 356, may depend on the operating state of the motor 240. During startup, the model 350 can be assumed to be adiabatic, modeled by eliminating the resistive element 356. This results in a voltage representing the temperature U being calculated by the combination of elements 352 and 354. Further, if the motor 240 is rotating (e.g., causing the fan 250 to spin to cool the motor 240), the IED 220 may model the rotor resistance $R_R$ as a relatively lower value than a rotor resistance in which the motor 240 is stopped. The voltage from the combined effect of elements 352, 354, and 356 is compared in comparator 358 against the threshold of $I_L^2 T_A$. If it is greater than the threshold, then the model produces an output 360 resulting in a trip signal, ultimately causing the motor to trip off.

Described above is one thermal model that may be used to provide thermal protection to an electric motor. It should be understood that alternative thermal models may be used to provide thermal protection to an electric motor. The rotor resistance calculated herein may be used in any thermal model that uses rotor resistance for the thermal protection of the electric motor. Similar models may be used for thermal protection of the stator.

Referring back to FIG. 1, the IED 220 may use preset settings (e.g., preset coast times 108) in the thermal model to estimate the thermal conditions of the motor 240. For example, the IED 220 may model the electric motor 240 as stopped after electric power is disconnected and overestimate the amount of time to cool the motor 240.

Because the thermal conditions may be overestimated, the IED 220 may prevent the motor 240 from electrically reconnecting to electric power for a longer period of time than if the actual thermal conditions were known. For example, the IED 220 may prevent the motor 240 from starting up at start time 212 because the thermal model indicates that the TCUs of the motor 240 will exceed the thermal limits ($TCU_{MAX}$) of the motor 240 during the restart 116 due to the preset coast time 108 decreasing slower than what measured thermal conditions would indicate. This may result in increased downtime for industries that use such motors. Accordingly, there is a need to estimate thermal conditions based on the operating conditions of the electric motor 240.

As described below, the IED 220 may determine thermal conditions of the motor 240 using a residual voltage of the motor 240 after power is electrically disconnected from the motor 240 to account for additional cooling of the motor 240. That is, due to the continued rotation after electric disconnection, the motor 240 will generate a voltage known as a residual voltage across the terminals of the motor 240. The magnitude of the residual voltage decays as the rotation of the motor 240 slows due to a decay of trapped flux in the air gap between the stator and the rotor of the motor 240. In addition to a decaying magnitude, the frequency of the residual voltage decreases with the slowing of the rotor. According to several embodiments herein, the IED 220 obtains voltage measurements from the PTs 210A-C and uses the voltage measurements to monitor the motor 240 after electric power is disconnected.

The IED 220 may determine thermal conditions of the motor 240 that account for a coast time in which the electric motor 240 continues to rotate due to inertia of the rotor, which causes additional cooling (e.g., due to rotation of the fan 250). The coast time may be used to determine a rate 120 of cooling following removal of electric power from the motor 240. By determining the thermal conditions based on the thermal model that uses the coast time derived from the residual voltage, the IED 220 may reconnect, at start time 112, electric power to the motor 240 faster than if the model sets the motor 240 to stopped conditions. That is, the IED 220 may determine that the thermal conditions of the motor 240 are not expected to exceed the thermal limits of the motor 240 at start time 112 during start-up 130 of the motor 240 because of the additional cooling accounted for in the thermal model using the residual voltages. Additionally and/or alternatively to coast time, the IED 220 may determine thermal conditions of the motor 240 using a thermal model based on an rotor resistance from the residual voltage.

Figure 4:
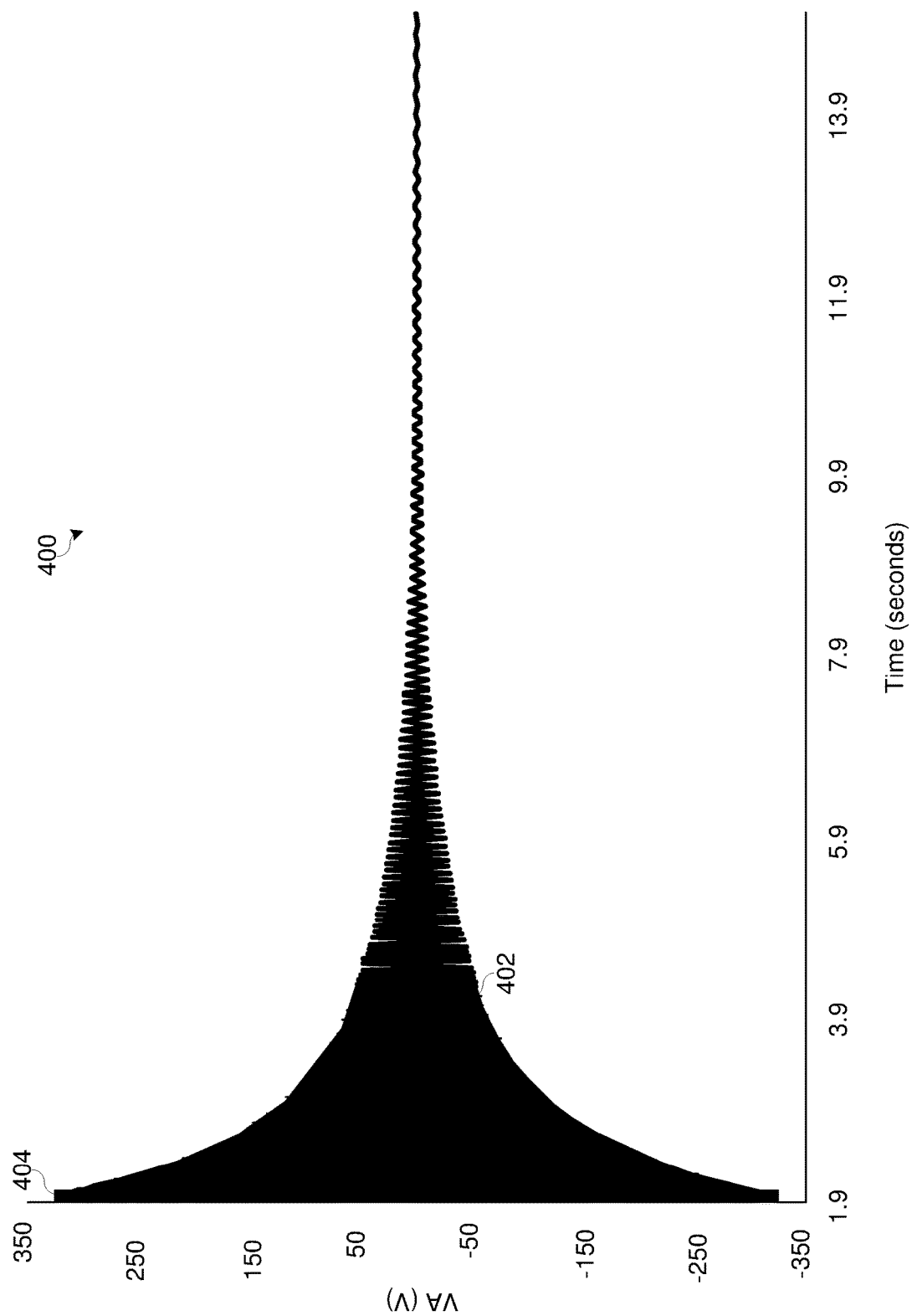
FIG. 4 illustrates a plot of residual voltage measured during a spin-down of the electric motor of FIG. 2, in accordance with an embodiment.

FIG. 4 illustrates a plot 400 of a measured residual voltage 402 over time of the electric motor 240 before and after tripping the motor 240 off line. Electric power is removed from the motor 240 just after time 2.0 seconds 404. Both the magnitude of the residual voltage and the frequency of the residual voltage decrease over time. Although not separately illustrated, it may be observed that the magnitude decreases to zero before the frequency decreases to zero. That is, in certain installations the rotor continues to spin down after the residual voltage signal is not detected. As has been described above, upon removal of electric power source to the electric motor, the rotor continues to spin down, and a residual voltage is induced between the terminals of the electric motor.

Figure 5:
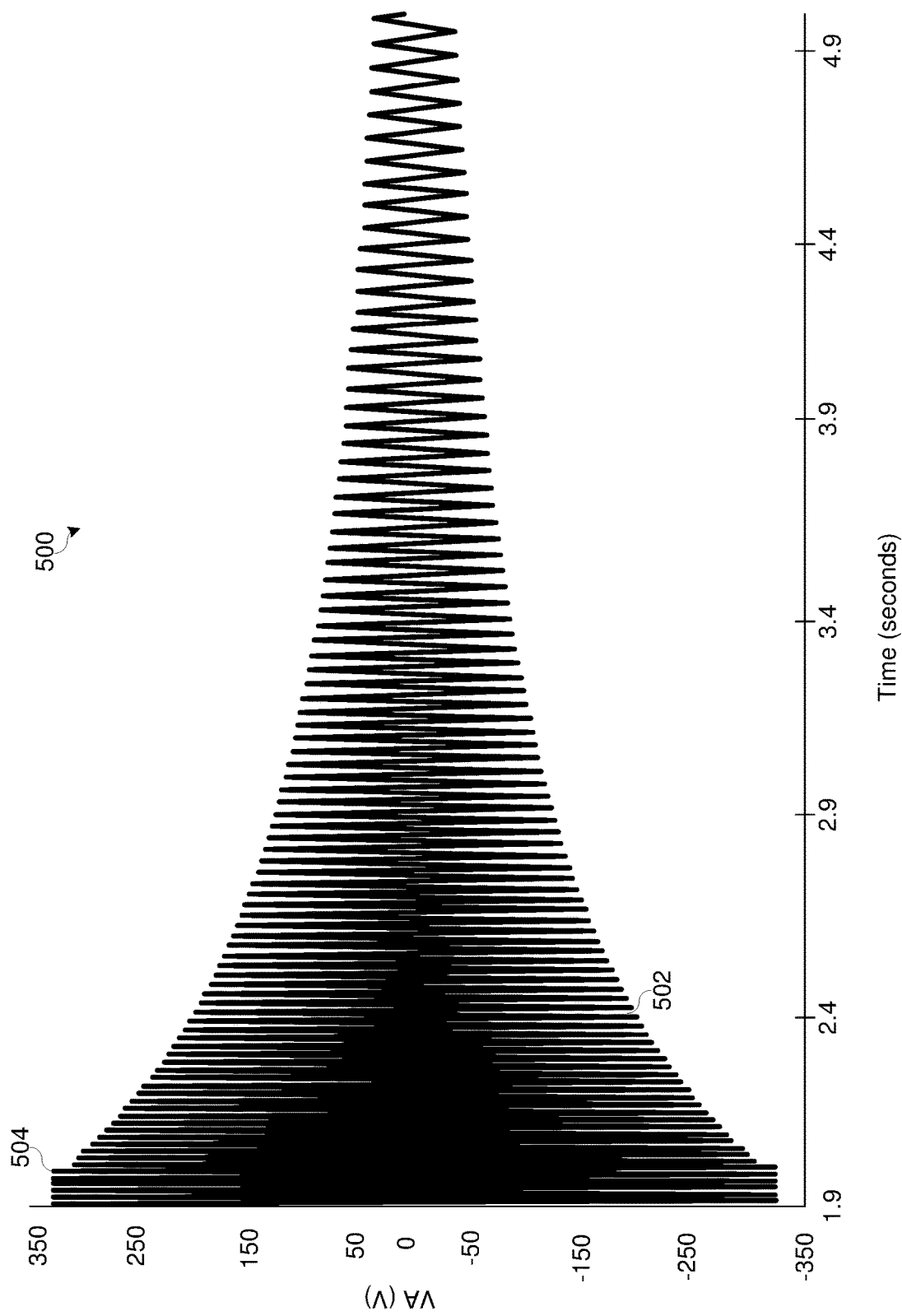
FIG. 5 illustrates another plot of residual voltage measured during a spin-down of the electric motor of FIG. 2, in accordance with an embodiment.

FIG. 5 illustrates another plot 500 of a measured residual voltage 502 over time of the electric motor 240, with the plot being cropped to show further detail of the change in frequency and magnitude of the residual voltage signal 502 after the time 504 that electric power is removed from the electric motor. FIG. 5 shows the decreasing frequency and decreasing magnitude of the residual voltage signal. The residual voltage of FIGS. 4 and 5 may be used to determine the speed of the rotor after electric power is disconnected from the motor 240.

Figure 6:
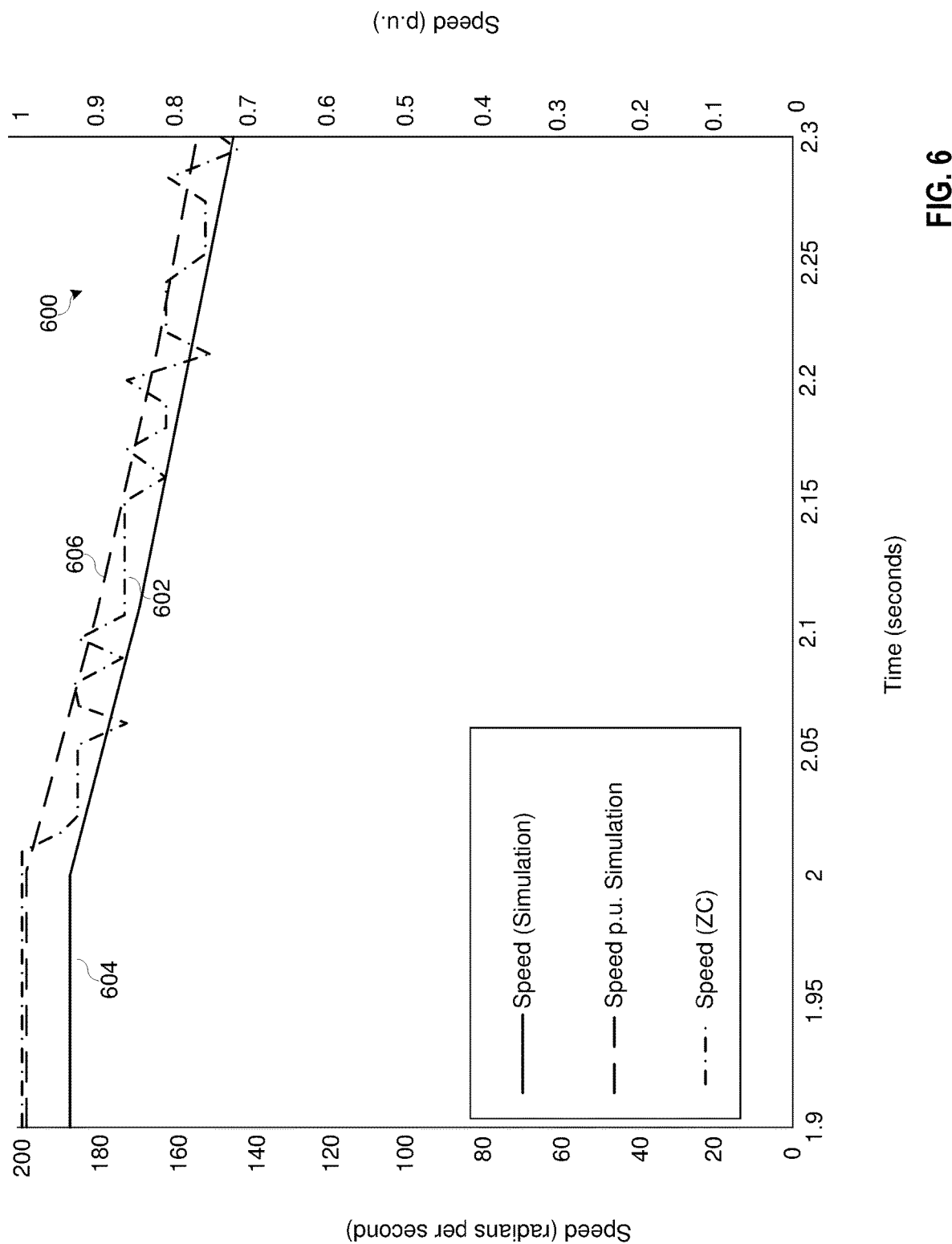
FIG. 6 illustrates a plot of speed measured during a spin-down of the electric motor of FIG. 2, in accordance with an embodiment.

FIG. 6 illustrates a plot 600 of the simulated rotor speed in radians per second 604, simulated rotor speed in per-unit 606, and rotor speed 602 calculated with zero-crossings of the residual voltage signal. The IED 220 may determine a coast time, using the rotor speed 602, in which the rotor continues to rotate after power is electrically disconnected. As with several other illustrations herein, electric power is removed from the motor 240 at around 2.0 seconds on the illustrated plot, after which time the calculated speed 602 decreases.

Although in several figures herein a single phase of residual voltage magnitude is illustrated for simplicity, the rotor speed may be calculated using one or more phases of residual voltage, sequence residual voltages (positive sequence, negative sequence, or zero sequence), Clarke components, DQ voltages, or the like.

Using the residual voltages, the speed of the rotor after the motor has been disconnected from the power system can be computed using Equation 5:

$$\text{Speed}[p.u.] = \frac{F_{rv}}{F_N} \qquad \text{Eq. 5}$$

Where:

Speed[p.u.] is the speed of the rotor in per-unit of nominal;

$F_{rv}$ is the frequency of the residual voltage; and, $F_N$ is the nominal frequency of the power system.

The frequency of the residual voltage $F_{rv}$ for a phase of the residual voltage may be calculated using Equation 6:

$$F_{rv} = \frac{1}{2*T_{zc}} \qquad \text{Eq. 6}$$

Where:

$T_{zc}$ is the time between sequential zero crossings.

Using the time at which the residual voltage magnitude or frequency falls to zero or not reliably measured may be conservative for cooling in that the rotor continues to spin and experience the cooling effects of spinning even after the residual voltage magnitude or frequency fall to zero and not be reliably measured. Accordingly, in certain embodiments the coast time may be calculated by extrapolating a time when the frequency of the rotor will fall to zero using the measured residual voltage. In this embodiment, a rate of deacceleration of the rotor may be calculated using a set of measured residual voltage values (such as, for example, zero crossing times), and the time to deaccelerate to zero may be calculated using the deacceleration rate. In certain embodiments, the rate of deacceleration is assumed to be exponential. In other embodiments, the rate of deacceleration is assumed to be linear, and a subset of residual voltage measurements after an initial falling period may be used to calculate the coast time. By using the residual voltage to determine the coast time, the coast time may then be used to determine thermal conditions of the motor 240 as described with respect to FIG. 8.

Additionally and/or alternatively, the IED 220 may determine the rotor resistance ($R_R$) 356 of the thermal model 350 using the residual voltage. According to several embodiments herein, the rotor resistance may be calculated using the measured active power before the motor 240 stops and the slip (or a function of a per-unit speed) of the motor measured using residual voltage. The rotor resistance (at full slip) $R_0$ may be calculated using Equation 7:

$$R_0 = S\frac{I^2}{Q} = FLA^*1^\wedge 2/1 \qquad \text{Eq. 7}$$

Where:
R₀ is the rotor resistance at full load slip;
S is the slip (in per-unit) (FLA);
I is the current (in per-unit of full-load); and
Q is the torque (in per-unit of full-load).

The rotor resistance $R_0$ may be calculated using a current and power measured at the moment before electric power is removed from the motor 240 and the residual voltage values after electric power is removed from the motor 240. In particular, the current and power (or torque) may be measured using the current and voltage values obtained from the terminals of the electric motor 240 at the moment before electric power is removed from the motor 240. In certain embodiments, the measured power may be substituted for the torque.

The operating rotor resistance $R_R$ 356 of the motor 240 may be a resistance between the locked rotor resistance $R_M$ (e.g., resistance when slip is at or approximately one) and a full speed slip resistance $R_0$ (e.g., resistance when slip is at or approximately zero) depending on the slip. For example, the rotor resistance $R_R$ may be calculated linearly between the resistances based on the slip as:

$$R_R = R_M S + R_0(1-S) \qquad \text{Eq. 8}$$

Where
$R_M$ is rotor resistance during the locked conditions;
$R_0$ is the rotor resistance at full load from equation 7; and
S is the slip.

The slip value may be calculated using the residual voltage values obtained after electric power is removed from the electric motor 240. Using the rate of decay of the frequency of the residual voltage, a rotor speed at the moment electric power is removed from the electric motor 240 may be extrapolated. That is, a backwards extrapolation in time of a rotational frequency of the rotor to the time that the electric power is removed from the motor 240 may be performed using the frequency of the measured residual voltage. The extrapolated rotational frequency $f_0$ at the time that power is removed from the electric motor 240 may be normalized to the nominal full-load rotational frequency of the electric motor 240 to produce $f_N$. The slip used in equation 7 and 8 may be the calculated per-unit frequency subtracted from one (from equation 3). Using these values for slip, current, and torque at the moment before power is removed from the electric motor, the rotor resistance may be calculated, and used in the various IED thermal models for providing thermal protection to the motor 240.

Figure 7:
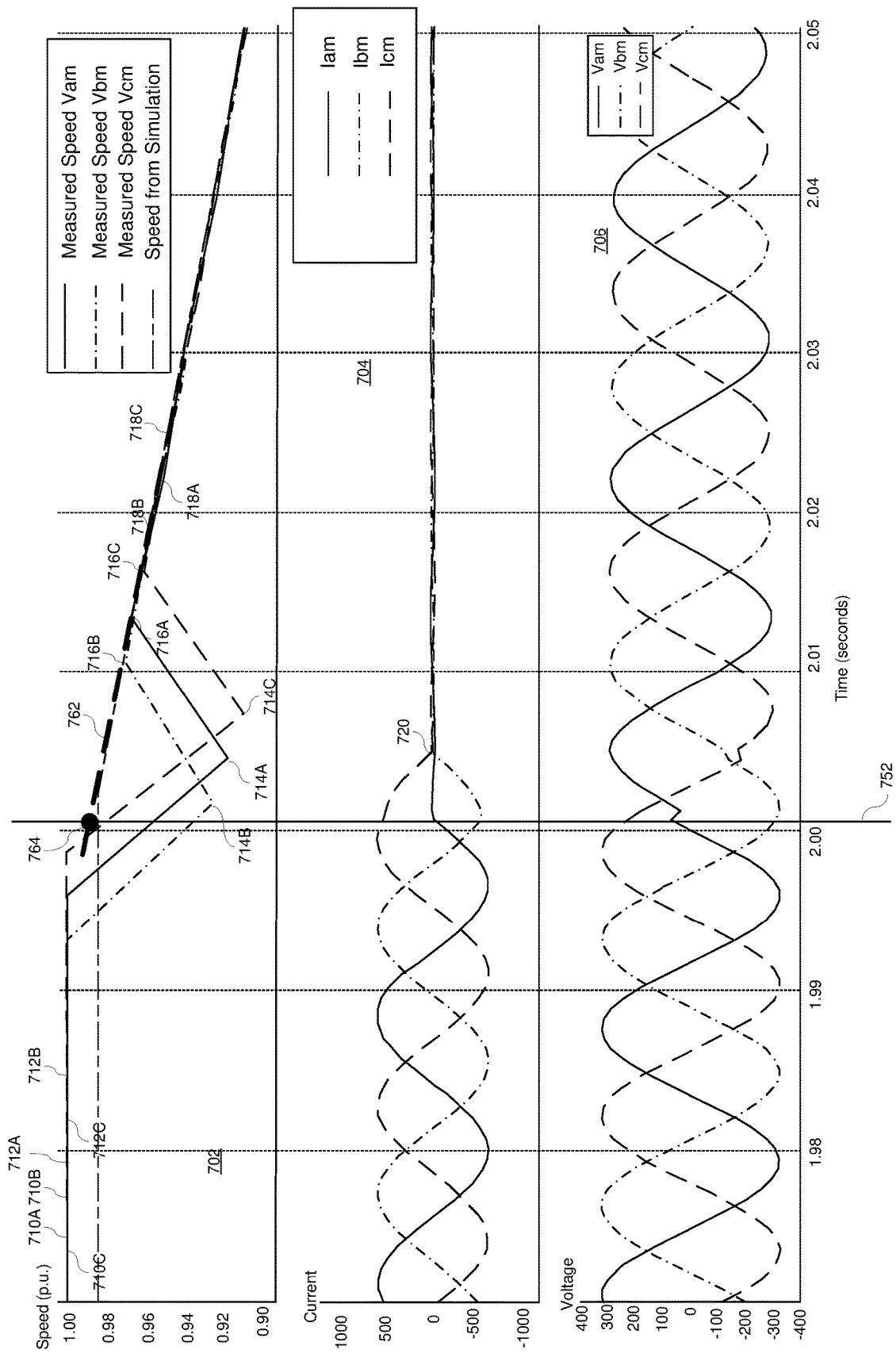
FIG. 7 illustrates plots of voltages, currents, and calculated rotor speeds before and after electric power is removed from the electric motor of FIG. 2, in accordance with an embodiment.

FIG. 7 illustrates three plots of motor measurements taken before, during and after removal of electric power from an electric motor 240. Plot 704 illustrates the three phase currents, and plot 706 illustrates the three phase voltages measured before (time 0-2.0), at, and after (time 2.0—end) removal of electric power to the electric motor 240. Although an open command is issued at time 2.0, the first contactor to open actually opens at time 752, at the first current zero-crossing, which happens to be the B-phase current. The remaining phases both open at the next zero crossing at 720. Accordingly, the instant of opening is noted at time 752 for calculation of the rotor speed at the instant of opening, which may be used in the calculation of the rotor resistance.

Plot 702 illustrates measured rotor speeds calculated from zero crossings of residual voltages. The calculated speed for each phase may be calculated using times of zero crossings for each phase and Equations 5 and 6. Illustrated are zero crossings for each phase 710A-C, 712A-C before opening and after opening 714A-C, 716A-C, and 718A-C. For example, to find the speed of the A phase voltage signal, the time of zero crossing 716A may be subtracted from the time of zero crossing 718A to determine the $T_{zc}$ for use in equations 5 and 6. Using the calculated speeds for each phase, a linear extrapolation backwards to the time 752 that electric power is removed from the motor may be performed, yielding the rotor speed 764. For example, the speed at time 2.01 and the speed at time 2.02 may be used to extrapolate backwards linearly to find the speed at time 2.00. In other embodiments, different extrapolation techniques may be used such as, for example, exponential, polynomial, or the like.

Plot 706 illustrates a slight phase shift in the voltage signal at the time of opening 752 due to the first opening of the single B phase in the effective WYE connection of the electric motor, leaving the A and C phases to shift from the three-phase WYE connection to a two-phase connection. Accordingly, a phase shift in each of the phases to balance the new configuration is observed, resulting in three voltage zero crossings at times (714A-C).

Figure 8:
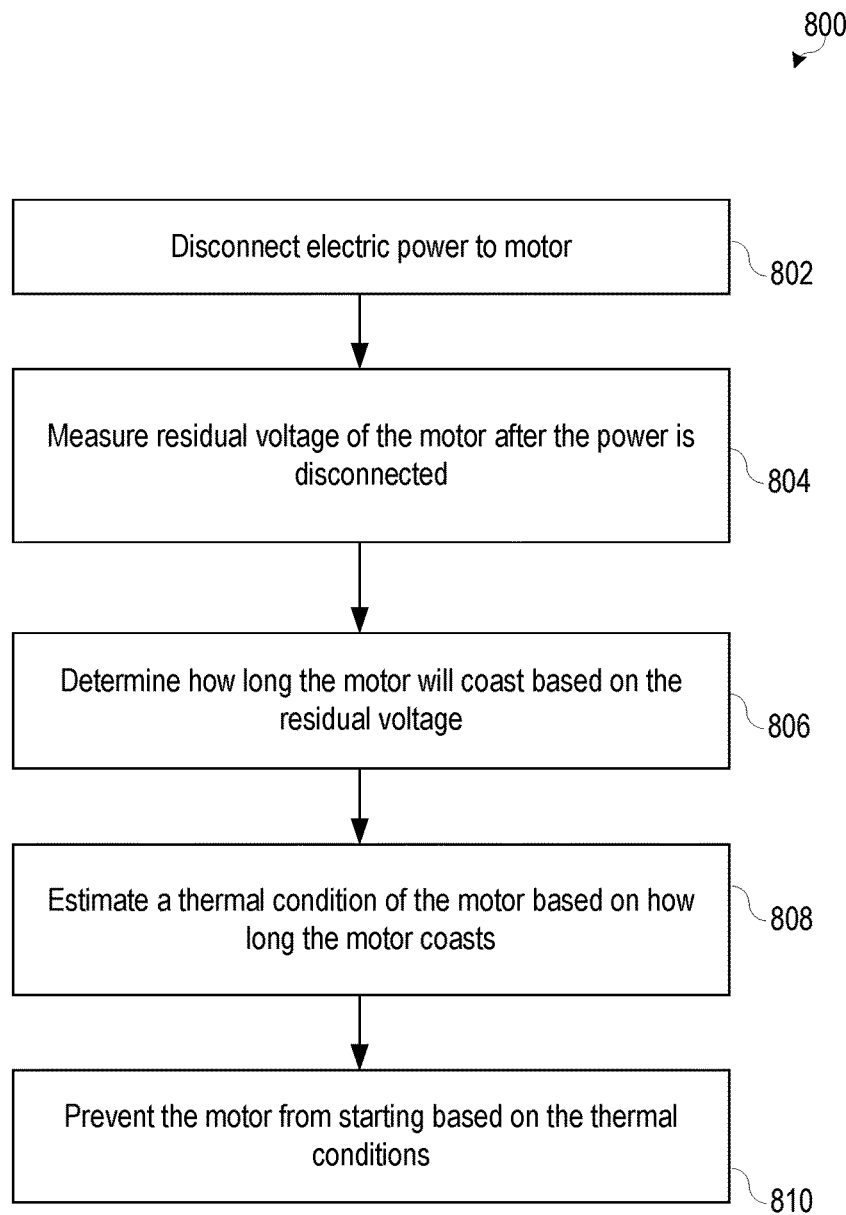
FIG. 8 illustrates a flow chart of a process performed by the IED of FIG. 2, in accordance with an embodiment.

FIG. 8 is a flow chart of a process that may be performed by the IED 220 of FIG. 2. The process 800 may be stored on a non-transitory computer readable medium (e.g., code) and executed by one or more processor(s) of the IED 220 to cause the IED 220 to perform the actions described herein. The process 800 may begin upon disconnecting electric power to the motor. For example, the IED 220 may send a signal to the switching device 230 to cause the switching device 230 to electrically disconnect the motor 240 from the power generator (block 802). In some embodiments, the IED 220 may receive a signal indicating that electric power to the motor 240 is disconnected. The IED 220 may measure a residual voltage, via the potential transformers 208A, 208B, and 208C, after the electric power is disconnected (block 804).

The IED 220 may then determine a coast time based on the residual voltage (block 806). In one embodiment, the coast time may be calculated as the time from the removal of electric power to the motor 240 to the time that the measured magnitude of the residual voltage falls to a preset value (e.g., zero). In another embodiment, the coast time may be calculated as the time from the removal of electric power to the motor to the time that the frequency of the residual voltage signal falls to a preset value (e.g., zero). It has been observed that the rotor continues to spin even after the residual voltage magnitude falls to zero. Accordingly, certain embodiments determine the coast time using the rate of deceleration of the rotor frequency calculated using the residual voltage. In one embodiment zero-crossing times of the residual voltage is used to determine the rotor frequency, the deceleration of the rotor, and to estimate a coast time. In yet another embodiment, the coast time can be calculated as the time between the removal of the electric power from the motor and the time that the speed goes to zero.

The IED 220 may use the coast time in a thermal model to determine a thermal condition of the electric motor 240 (block 808). The thermal condition may be derived from the thermal model 350 to model the heat dissipation of the motor 240. The IED 220 may represent the thermal model 350, for example, as a set of equations based on the expected rate of cooling of the motor 240 according to the conditions of the motor 240. For example, IED 220 may model the thermal conditions during the coast time using a rotor resistance at a relatively lower value than a rotor resistance used when the motor 240 is stopped.

The updated coast time may be used to more accurately calculate the cooling effects of the spin-down on the motor 240, such that a more accurate thermal condition may be used in thermal condition calculations during subsequent startups. That is, the thermal condition of the motor 240 using the calculated coast time may indicate a lower rotor temperature than would have been calculated using estimated coast times. This would allow for starting the motor 240 sooner, or allowing a longer start period for the motor on a subsequent start.

The IED 220 may then prevent the motor 240 from restarting based at least in part on the thermal condition (block 810). For instance, the IED 220 may receive a start signal indicating a request for the IED 220 to start the motor by closing the switching device 230. If the IED 220 receives the start signal during a time in which the thermal model indicates that the thermal conditions of the motor may exceed thermal limitations, the IED 220 may prevent closing of the switching device 230 to protect the motor 240. That is, the IED 220 may block a close signal to the switching device 230 until the thermal conditions indicate that the motor 240 will not exceed thermal limits during a restart. The IED 220 may then start the motor 240 upon receiving a start signal and the thermal conditions of the motor 240 not exceeding thermal limitations of the motor 240.

Figure 9:
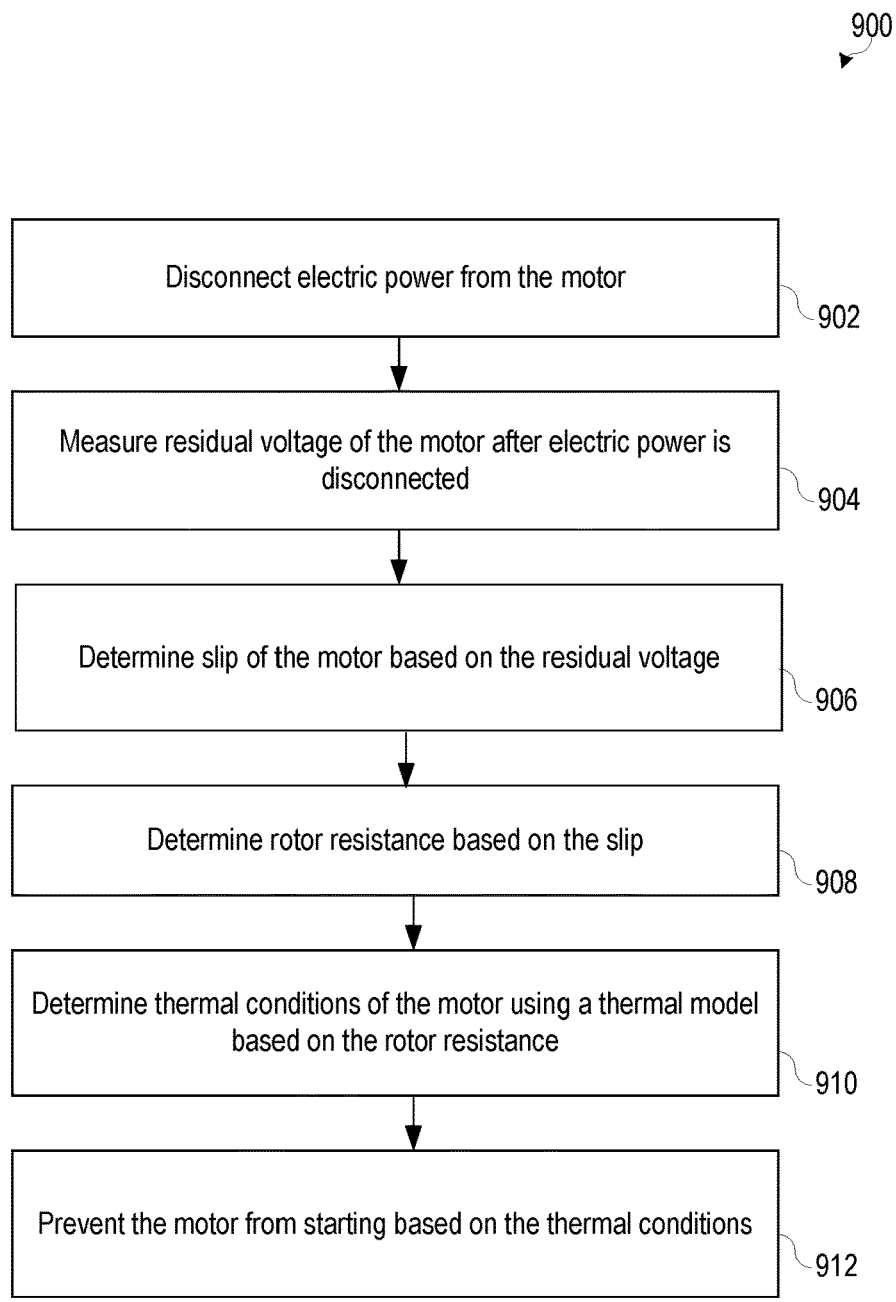
FIG. 9 illustrates a flow chart of another process performed by the IED of FIG. 2, in accordance with an embodiment.

FIG. 9 is a flow chart of another process that may be performed by the IED 220 of FIG. 2. The process may be stored on a non-transitory computer readable medium (e.g., code) and executed by one or more processor(s) of the IED 220 to cause the IED 220 to perform the actions described herein. The process 900 may begin with disconnecting electric power to the motor (block 902), similar to the step (block 802) performed with respect to FIG. 8. The IED 220 may acquire residual voltage measurements of the motor 240 after electric power is disconnected (block 904), similar to the corresponding step (block 804) performed with respect to FIG. 8.

The IED 220 may then determine a slip of the motor 240 based on the residual voltage measurements. For example, the slip may be calculated as the per-unit frequency of the motor 240 prior to removing electric power. To determine the per-unit frequency of the motor 240, the IED 220 may measure residual voltage frequency and the rate at which the residual voltage frequency decreases because the residual voltage frequency may be representative of the motor 240 frequency after removing electric power. That is, the IED 220 may determine the per-unit frequency of the motor 240 as the residual voltage frequency at or prior removing electric power to the motor 240, as described in FIG. 7.

The IED 220 may determine the rotor resistance based on the slip (block 908). For example, the IED 220 may calculate the rotor resistance using equation 8 or any other suitable calculation according to the thermal model. The IED 220 may determine the thermal conditions of the motor 240 using a thermal model based on the rotor resistance (block 910). By determining the thermal conditions using the rotor resistance derived from the residual voltage frequency, the thermal model may more accurately represent the thermal conditions of the motor 240 in the next start. The IED 220 may then prevent the motor from restarting based on the thermal conditions (similar to block 810 described above).

Figure 10:
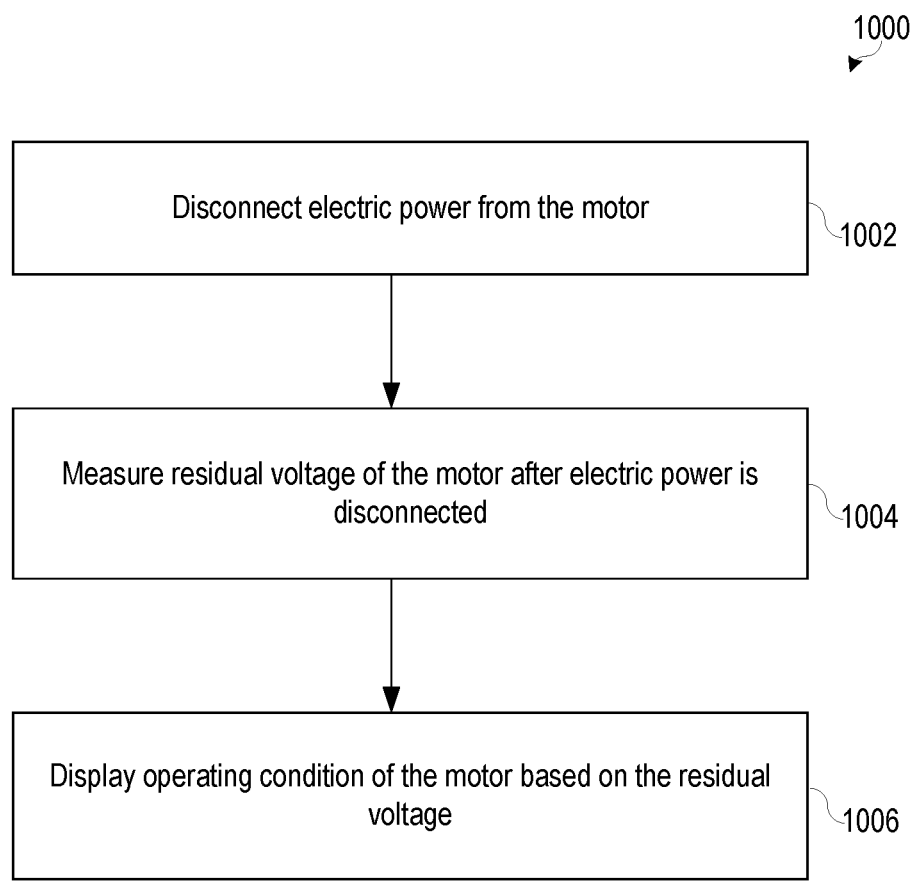
FIG. 10 illustrates a flow chart of yet another process performed by the IED of FIG. 2, in accordance with an embodiment.

FIG. 10 is another flow chart of yet another process 1000 that may be performed by the IED 220 of FIG. 2. The IED 220 may disconnect electric power from the motor 240, similar to the steps (block 802 and block 902) performed with respect to FIGS. 8 and 9. The IED 220 may then acquire residual voltage measurements of the motor 240 after electric power is disconnected (block 1104) similar to the steps (block 804 and block 904) performed with respect to FIGS. 8 and 9. Further, the IED 220 may display an operating condition of the motor 240 based on the residual voltage measurements (block 1106). The measured residual voltages may be used to generate a display useful for monitoring a condition of the electric motor 240, detecting electrical issues, and detecting mechanical issues associated with the electric motor 240. In certain embodiments, a display of the immediate past spin-down of the motor 240 using the measured residual voltages may be created and displayed. Such a display may include the calculated spin down time (e.g., coast time), the deacceleration rate, the decay rate of the residual voltage magnitude, the decay rate of the residual voltage frequency, the slip and speed values in per-unit extrapolated backwards in time to the moment that electric power is disconnected from the motor, and the like. The display may include a plot of the residual voltage or other values such as the plots illustrated in FIGS. 4, 5, and 6.

The display may also include historical data such as, for example, any of the values listed above from a previous spin down; averages from previous spin downs; averages from the first number of spin downs, and the like. The display may include an indication that the present spin down values are significantly different from previous spin down values. In certain embodiments, the significant difference is determined by the difference between the present value and the previous value (or average previous values) exceeding a predetermined threshold.

Figure 11:
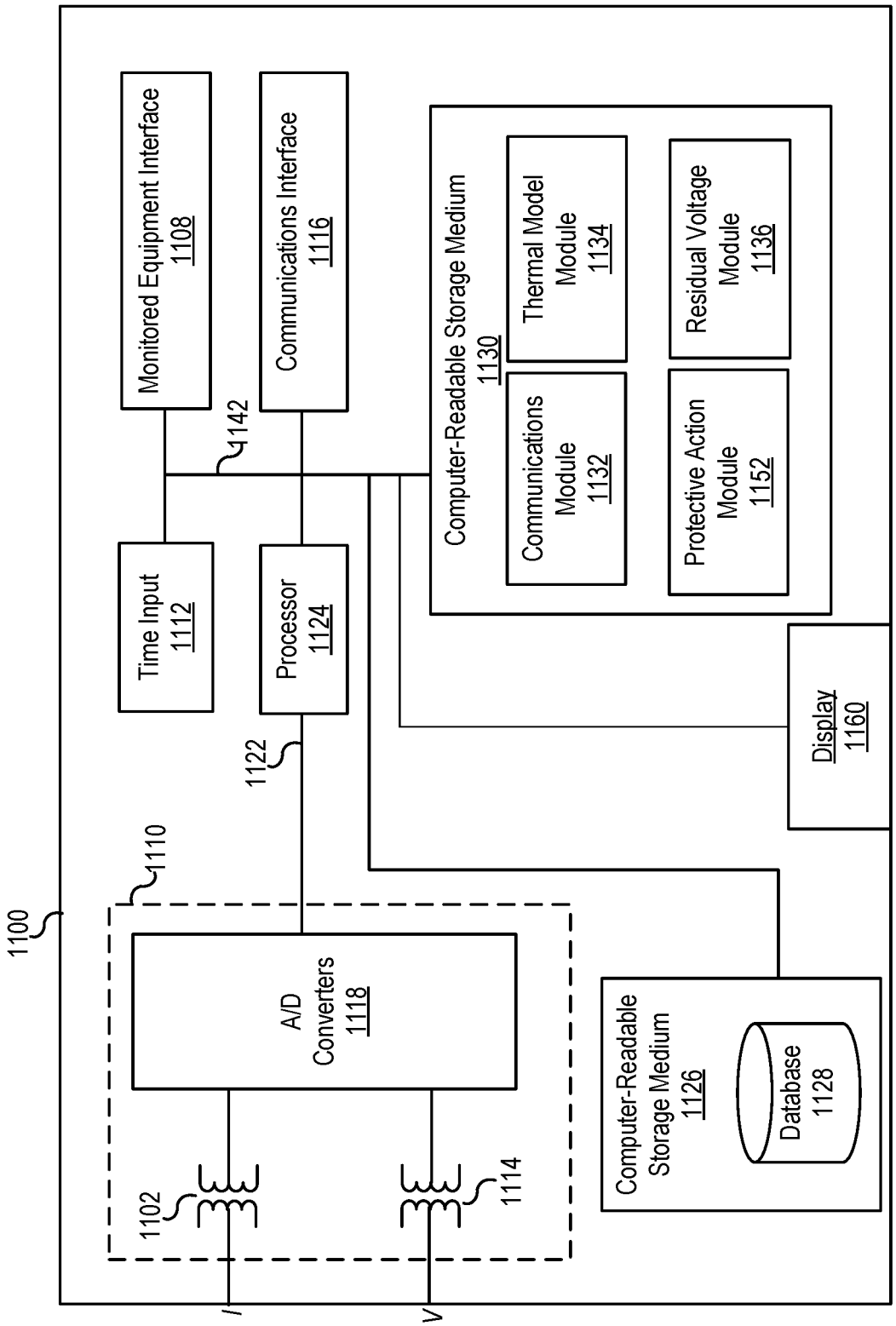
FIG. 11 illustrates a block diagram of the IED of FIG. 2, in accordance with an embodiment.

FIG. 11 illustrates a block diagram of a system 1100 useful for monitoring an electric motor in accordance with several embodiments described herein. The system 1100 may be useful for monitoring a thermal condition of an electric motor, and performing protection actions when the electric motor operates outside of acceptable conditions. The system 1100 may be configured to calculate a coast time for the rotor using residual voltage measurements from the electric motor according to several embodiments described herein. The system 1100 may be configured to calculate a rotor resistance from current and voltage measurements during operation of the motor and residual voltage measurements from the electric motor according to several embodiments herein. The system 1100 may be configured to display to a user, on a display screen, representations of the calculated conditions of the motor according to several embodiments herein.

In certain embodiments, the system 1100 may comprise an IED system configured to, among other things, obtain and calculate operating conditions of a motor using voltages and currents measured from terminals of the motor, including residual voltages measured after removal of electric power from the motor. System 1100 may be configured to calculate operating conditions of the motor using measurements therefrom and monitor the motor by comparing the calculated operating conditions against thresholds, and take a protective action when the operating conditions exceed the acceptable thresholds. System 1100 may be further configured to update thresholds and settings based on calculations made from measurements taken from the motor. Further still, the system 1100 may be configured to generate a display of operating conditions of the motor during spin-down of the electric motor.

System 1100 may be implemented using hardware, software, firmware, and/or any combination thereof. In some embodiments, system 1100 may be embodied as an IED, while in other embodiments, certain components or functions described herein may be associated with other devices or performed by other devices. The specifically illustrated configuration is merely representative of one embodiment consistent with the present disclosure.

System 1100 may, in certain embodiments, include a communications interface 1116 configured to communicate with devices and/or IEDs. In certain embodiments, the communications interface 1116 may be embodied as communication circuitry (e.g., a transceiver) to facilitate direct communication with other IEDs or communicate with systems over a communications network. Communications interface 1116 may facilitate communications through a network. System 1100 may further include a time input 1112, which may be used to receive a time signal (e.g., a common time reference) allowing system 1100 to apply a time-stamp to the acquired samples. In certain embodiments, a common time reference may be received via communications interface 1116, and accordingly, a separate time input may not be required for time-stamping and/or synchronization operations. One such embodiment may employ the IEEE 1588 protocol. A monitored equipment interface 1108 (e.g., input/output circuitry) may be configured to receive status information from, and issue control instructions to, equipment. Such equipment may include the electric motor, a circuit breaker in electrical communication with the motor and configured to interrupt electric power to the electric motor, a switching device in electrical communication with the motor configured to supply or interrupt electric power to the electric motor, and the like.

Processor 1124 may be configured to process communications received via sensor component 1110, communications interface 1116, time input 1112, and/or monitored equipment interface 1108. Processor 1124 may operate using any number of processing rates and architectures. Processor 1124 may be configured to perform various algorithms and calculations described herein. Processor 1124 may be embodied as a general purpose integrated circuit, an application specific integrated circuit, a field-programmable gate array, and/or any other suitable programmable logic device. In some embodiments, processor 1124 may be referred to as processing circuitry.

In certain embodiments, system 1100 may include a sensor component 1110 (e.g., sensor circuitry). In the illustrated embodiment, sensor component 1110 may gather data directly from electric power system equipment such as a conductor (not shown) using PTs and/or CTs. The sensor component 1110 may use, for example, transformers 1102 and 1114 and A/D converters 1118 that may sample and/or digitize filtered waveforms to form corresponding digitized current and voltage signals provided to data bus 1122. Current (I) and voltage (V) inputs may be secondary inputs from conventional instrument transformers such as, CTs and VTs. A/D converters 1118 may include a single A/D converter or separate A/D converters for each incoming signal. A current signal may include separate current signals from each phase of a three-phase electric power system. A/D converters 1118 may be connected to processor 1124 by way of data bus 1122, through which digitized representations of current and voltage signals may be transmitted to processor 1124. In various embodiments, the digitized current and voltage signals may be used for the monitoring and protection of the electric motor as described herein.

A computer-readable storage medium 1126 may be the repository of a database 1128 containing electric motor properties, such as nameplate settings, spin-down times, resistances, and/or the like. Another computer-readable storage medium 1130 may be the repository of various software modules configured to perform any of the methods described herein. A data bus 1142 may link monitored equipment interface 1108, time input 1112, communications interface 1116, and computer-readable storage mediums 1126 and 1130 to processor 1124.

Computer-readable storage mediums 1126 and 1130 may be separate mediums, as illustrated in FIG. 11, or may be the same medium (i.e. the same disk, the same non-volatile memory device, or the like). Further, the database 1128 may be stored in a computer-readable storage medium that is not part of the system 1100, but that is accessible to system 1100 using, for example, communications interface 1116.

Communications module 1132 may be configured to allow system 1100 to communicate with any of a variety of external devices via communications interface 1116. Communications module 1132 may be configured for communication using a variety of data communication protocols (e.g., UDP over Ethernet, IEC 61850, etc.). In one particular embodiment, the communications module 1132 may be in communication with the communications interface, which may be in communication with a user display (such as a screen mounted on an IED, a monitor, or the like) The communications module may be configured to format the generated display to a format expected by the user display for presenting the display to the user according to several embodiments herein.

A residual voltage module 1136 may receive voltage measurements obtained from the electric motor using the sensor component 1110. The residual voltage module 1136 may calculate residual voltage magnitudes, frequencies and zero-crossings as described herein. The residual voltage module 1136 may calculate a spin-down time of the rotor using the residual voltage measurements as described herein. The residual voltage module 1136 may calculate speed of the rotor, and extrapolate backwards to determine the speed of the rotor at the time that power is disconnected from the electric motor 240 as described herein. The residual voltage module 1136 may be configured to determine a rotor resistance using the calculated speed, and measured voltages and currents as described herein. The residual voltage module 1136 may be in communication with the computer-readable storage medium 1126 to update certain settings such as rotor resistance and spin-down time. The residual voltage module 1136 may be in communication with the communications module such that the communications module may use calculations from the residual voltage module 1136 in generation of the display.

A thermal model module 1134 may be configured to determine a thermal condition of the motor using the current and voltage measurements, settings from the computer-readable storage medium 1126, and values calculated from the residual voltage module 1136. The thermal model module 1134 may use various thermal models to determine a thermal condition of the motor, and to compare the thermal condition against thresholds. Upon the thermal condition exceeding a threshold, the thermal model module 1134 may signal such to the protective action module.

A protective action module 1152 may be configured to implement a protective action based on the monitored operating conditions exceeding the threshold according to several embodiments herein. In various embodiments, a protective action may include tripping a breaker or other switching device, selectively isolating the electric motor from the electric power supply. In various embodiments, the protective action module 1152 may coordinate protective actions with other devices in communication with system 1100.

In the illustrated embodiment, the system 1100 includes a display 1160 operatively connected to the processor 1124.

The processor 1124 may send signals to the display to cause the display to display the stopping reports described above. By presenting operators with the operating conditions of the motor 240, the operators may perform corrective actions to protect the motor. In other embodiments, the system 1100 may communicate with an external display via inputs/outputs.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may not include long-distance transmission of high-voltage power. Moreover, principles described herein may also be utilized for protecting an electric system from over-frequency conditions, wherein power generation would be shed rather than load to reduce effects on the system. Accordingly, many changes may be made to the details of the above-described embodiments without departing from the underlying principles of this disclosure. The scope of the present invention should, therefore, be determined only by the following claims.

What is claimed is:

1. An intelligent electronic device (IED), comprising:
a processor operatively coupled to a memory, wherein the processor is configured to execute instructions stored on the memory to cause the processor to:
acquire operating voltage measurements, via a voltage sensor, of electrical energy provided to a motor that causes the motor to rotate while the motor is connected;
acquire residual voltage measurements, via the voltage sensor, caused by continued rotation of the motor after disconnecting electric power to the motor;
determine a coast time of the motor based at least in part on the residual voltage measurements;
determine a thermal condition of the motor using a thermal model that accounts for the coast time of the motor after disconnection of the electric power from the motor; and
prevent a subsequent starting of the motor based at least in part on the thermal condition.

2. The IED of claim 1, comprising a switching device configured to selectively electrically connect or electrically disconnect electric power to the motor.

3. The IED of claim 2, comprising a potential transformer as the voltage sensor, wherein the potential transformer is electrically coupled between the switching device and the motor.

4. The IED of claim 1, wherein the processor is configured to execute instructions stored on the memory to cause the processor to:
determine a rotor resistance of the motor based at least in part on the residual voltage measurements; and
determine the thermal condition of the motor using a thermal model that accounts for the rotor resistance based at least in part on the residual voltage measurements.

5. The IED of claim 1, comprising a display screen configured to display a stop report of the motor.

6. The IED of claim 5, wherein the stop report comprises the residual voltage measurements of the motor.

7. A system, comprising:
a voltage sensor configured to be operatively coupled between a switching device and a motor to acquire operating voltage measurements of electrical energy provided to the motor that causes the motor to rotate while the motor is connected, and to acquire residual voltage measurements from the motor after the motor has been disconnected, wherein the voltage sensor is configured to provide a voltage signal indicating the residual voltage measurements of the motor;

a processor operatively coupled to a memory, wherein the processor is configured to execute instructions stored on the memory to cause the processor to:
acquire the residual voltage measurements caused by continued rotation of the motor after disconnecting electric power to the motor;
determine a coast time of the motor based at least in part on the residual voltage measurements
determine a thermal condition of the motor based at least in part on the coast time; and
prevent starting of the motor based at least in part on the thermal condition.

8. The system of claim 7, wherein the processor is configured to execute instructions stored on the memory to cause the processor to:
determine a frequency of a residual voltage of the motor;
calculate a rate of deacceleration of a rotor of the motor using a rate of change of the frequency; and
determine the coast time by extrapolating a time when the rotor will stop rotating based at least in part on the rate of deacceleration.

9. The system of claim 8, wherein the processor is configured to execute instructions stored on the memory to cause the processor to determine the coast time by setting the rate of deacceleration of the rotor to be a linear rate.

10. The system of claim 8, wherein the frequency of the residual voltage is calculated based at least in part on zero-crossing times of the residual voltage.

11. The system of claim 7, wherein the thermal condition comprises thermal capacity used (TCUs) of the motor.

12. The system of claim 7, wherein the processor is configured to execute instructions stored on the memory to cause the processor to:
determine a slip of the motor based at least in part on the residual voltage measurements;
determine a rotor resistance based at least in part on the slip;
determine the thermal condition of the motor based at least in part on the rotor resistance; and
prevent starting the motor based at least in part on the thermal condition of the motor.

13. The system of claim 12, wherein the processor is configured to execute instructions stored on the memory to cause the processor to:
determine the slip as a per-unit frequency of the residual voltage prior to or at electric disconnection of the motor subtracted from one.

14. The system of claim 12, wherein the processor is configured to execute instructions stored on the memory to cause the processor to determine the rotor resistance as:

$$R_0 = S \frac{I^2}{Q}$$

where $R_0$ is the rotor resistance, S is the slip of the motor in per-unit, I is the current in per-unit of full-load, and Q is the torque of the motor in per-unit of full-load.

15. A method, comprising:
acquiring, via a voltage sensor, operating voltage measurements of electrical energy provided to a motor that causes the motor to rotate while the motor is connected;
acquiring, via an intelligent electronic device, residual voltage measurements caused by continued rotation of the motor after disconnecting electric power to the motor;
determine a coast time of the motor based at least in part on the residual voltage measurements;
determine the thermal condition of the motor using a thermal model that accounts for the coast time of the motor; and
displaying an operating condition of the motor based at least in part on the residual voltage measurements on a display screen of the intelligent electronic device, wherein the operating condition comprises a calculated spin down time, a deacceleration rate, a decay rate of a magnitude of the residual voltage measurements, a decay rate of a frequency of the residual voltage measurements, a slip, speed values in per-unit extrapolated backwards in time to a moment in which electric power is disconnected from the motor, or any combination thereof.

16. The method of claim 15, comprising
receiving, via sensor circuitry of the intelligent electronic device, residual voltage measurements of the motor after disconnecting electric power to the motor.

17. The method of claim 15, wherein the processor is configured to send a signal to the display screen to display historical data from previous electric disconnections, averages from previous electric disconnections, or any combination thereof.

* * * * *